(12) United States Patent
Nelson et al.

(10) Patent No.: US 10,601,829 B1
(45) Date of Patent: Mar. 24, 2020

(54) PLATFORM AND ASSOCIATED METHOD FOR AUTHENTICATING THE IDENTITY OF A USER IN A DECENTRALIZED SYSTEM WITHOUT NEED FOR A THIRD-PARTY IDENTITY SERVICE

(71) Applicant: Blockstack PBC, New York, NY (US)

(72) Inventors: Jude Nelson, New Brunswick, NJ (US);
Aaron Blankstein, Chicago, IL (US);
Lawrence Salibra, Hong Kong (CN);
Yukan Liao, Toronto (CA); Matthew Little, New York, NY (US)

(73) Assignee: Blockstack PBC, New York, NY (US)

( * ) Notice: Subject to any disclaimer, the term of this patent is extended or adjusted under 35 U.S.C. 154(b) by 0 days.

(21) Appl. No.: 16/555,677

(22) Filed: Aug. 29, 2019

(51) Int. Cl.
*H04L 29/06* (2006.01)
*H04L 9/08* (2006.01)
*H04L 9/32* (2006.01)
*G06F 16/954* (2019.01)

(52) U.S. Cl.
CPC ........ *H04L 63/0884* (2013.01); *G06F 16/954* (2019.01); *H04L 9/0861* (2013.01); *H04L 9/3226* (2013.01); *H04L 63/083* (2013.01); *H04L 63/12* (2013.01)

(58) Field of Classification Search
CPC ............. G06Q 20/065; G06Q 20/3829; G06Q 2220/00; G06Q 40/04; G06Q 20/10; G06Q 20/3674; G06Q 30/0207; G06Q 30/0226; G06Q 30/0601; H04L 2209/56; H04L 9/0637; H04L 2209/38; H04L 67/306; H04L 67/34; H04L 9/3236; G06F 16/27; G06F 21/62; G06F 8/61; G06F 9/44505
See application file for complete search history.

(56) References Cited

U.S. PATENT DOCUMENTS

| | | | |
|---|---|---|---|
| 2017/0213287 A1* | 7/2017 | Bruno | G06Q 40/04 |
| 2017/0236123 A1 | 8/2017 | Ali et al. | |
| 2018/0204213 A1* | 7/2018 | Zappier | H04L 63/08 |
| 2019/0149600 A1* | 5/2019 | Duan | G06F 21/64 |
| | | | 380/28 |

OTHER PUBLICATIONS

Nelson, Jude, "Subdomains: Scalable User Registration" (available at https://www.youtube.com/watch?v=ffprmuFD_d8), Mar. 22, 2018. (Year: 2018).
Subdomain-registrar/README.md, May 24, 2018. (Year: 2018).
Sponsored names: Implement instantaneous sponsored name registrar #750, Feb. 15, 2018. (Year: 2018).
Ali, Muneeb, Dissertation, Trust-to-Trust Design of a New Internet, dated Jun. 2017.
Ali, Muneeb et al., Blockstack: A New Decentralized Internet, dated May 2017.
Ali, Muneeb et al., Blockstack: A New Internet for Decentralized Applications, dated Oct. 2017.

(Continued)

*Primary Examiner* — Abiy Getachew
(74) *Attorney, Agent, or Firm* — Knobbe Martens Olson & Bear LLP

(57) ABSTRACT

A decentralized application platform and associated method creates an ID that can be used to sign into any decentralized application that follows the platform protocol without having a centralized third party having to vouch for the user's identity.

18 Claims, 7 Drawing Sheets

(56) References Cited

OTHER PUBLICATIONS

Ali, Muneeb et al., Blockstack: A Global Naming and Storage System Secured by Blockchains. In Proceedings of the 2016 USENIX Annual Technical Conference, Jun. 2016.
Ali, Muneeb et al., Bootstrapping Trust in Distributed Systems with Blockchains. In USENIX ;login 41(3):52-58, Fall 2016.
Ali, Muneeb et al., The Blockstack Decentralized Computing Network, dated May 30, 2019.
Nelson, Jude et al., Extending Existing Blockchains with Virtualchain. In Workshop on Distributed Cryptocurrencies and Consensus Ledgers, 2016.
Nelson, Jude, Dissertation: Wide-Area Software-Defined Storage, dated Jun. 2018.

* cited by examiner under # US 10,601,829 B1

PLATFORM AND ASSOCIATED METHOD FOR AUTHENTICATING THE IDENTITY OF A USER IN A DECENTRALIZED SYSTEM WITHOUT NEED FOR A THIRD-PARTY IDENTITY SERVICE

BACKGROUND

Field

This disclosure generally relates to networks implementing a blockchain. More specifically, this disclosure relates to off-chain storage of data accessible within the context of a blockchain network.

Description of the Related Art

Blockchain is a distributed digital ledger that allows multiple parties to engage in secure, trusted transactions with one another without an intermediary. The blockchain itself can include a chain of blocks that are linked together cryptographically, with each block in the chain storing one or more transactions and the number of blocks in the chain growing over time. The blocks can be linked together using a cryptographic hash. For example, each block can include a cryptographic hash of a previous block in the chain. Because each block includes a cryptographic hash of a previous block in the chain, a transaction stored in one block cannot be altered without all subsequent blocks being altered as well. The likelihood that all subsequent blocks being altered is low given that such an alteration would require approval from a majority of the computing devices or participants participating in the blockchain.

Individual blockchain records cannot hold much data, often on the order of single kilobytes. Off-chain backend data storage linked to a blockchain can increase the amount of storage available in the context of a blockchain-based network.

SUMMARY

The systems, methods, and devices described herein each have several aspects, no single one of which is solely responsible for its desirable attributes. Without limiting the scope of this disclosure, several non-limiting features will now be discussed briefly.

Systems and/or computer systems are disclosed that comprise a computer readable storage medium having program instructions embodied thereon, and one or more processors configured to execute the program instructions to cause the one or more processors to perform operations comprising one or more aspects of the above- and/or below-described embodiments (including one or more aspects of the appended claims, which are incorporated in this written description by reference).

Computer-implemented methods are disclosed in which, by one or more processors executing program instructions, one or more aspects of the above- and/or below-described embodiments (including one or more aspects of the appended claims) are implemented and/or performed.

Computer program products comprising a computer readable storage medium are also disclosed, wherein the computer readable storage medium has program instructions embodied thereon the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

Throughout the drawings, reference numbers may be (but are not necessarily) reused to indicate corresponding elements. The drawings are provided to illustrate example embodiments described herein and are not intended to limit the scope of the disclosure.

DETAILED DESCRIPTION

The following U.S. Patent Applications, filed Aug. 29, 2019, are incorporated by reference in their entireties (including the written description, claims, and drawings) for all that they disclose: U.S. patent application Ser. No. 16/555,533 (entitled CLIENT-SIDE AUTHENTICATION SYSTEM AND ASSOCIATED METHOD) and U.S. patent application Ser. No. 16/555,513 (entitled SYSTEM AND METHOD FOR REGISTERING INSTANTANEOUSLY CONFIRMABLE IDENTIFIER IN A BLOCKCHAIN-BASED DOMAIN NAME SYSTEM).

Blockchain Technology

Blockchains are decentralized digital ledgers that record information distributed among a network of computers. The decentralized digital ledgers ensure each computer has identical records. Blockchain technologies consist of three fundamental components: cryptographically linked data structures, networking, and consensus protocols.

Figure 1:
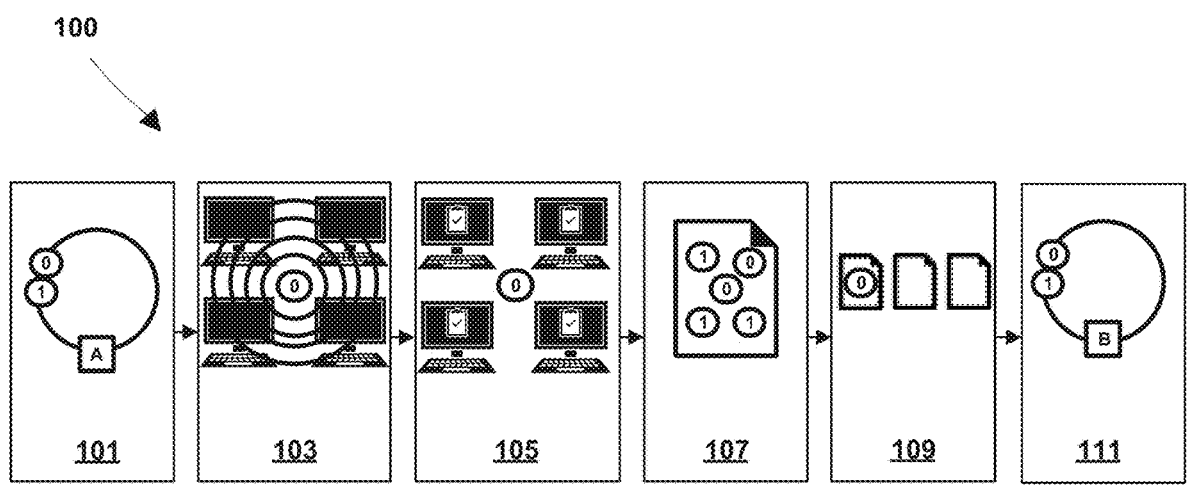
FIG. 1 provides an overview of a blockchain network.

First, a blockchain consists of a series of digital "blocks" that are securely linked together in sequential order using cryptography to create a virtual chain of data. These blocks record information such as financial transactions, agreements between parties, and ownership records, as shown in FIG. 1, which provides an overview of a blockchain network 100. In block 101 of FIG. 1, a transaction to transfer a digital coin from user A to user B is initiated by user A. In block 103, the transaction is broadcast to every node in the network. In block 105, the nodes form a consensus on whether the transaction is valid. In block 107, the nodes add valid transactions to a "block." In step 109, the block is added to the blockchain. In step 111, the transaction is complete and the digital coin transfers to user B (e.g., user B).

Second, a blockchain runs on a distributed network of computers. Computers in the network, also referred to as nodes, store copies of the blockchain, validate that the blockchain has not been tampered with, and verify when transactions can be added to a new block. Nodes share and synchronize all updates. To be clear, a node does not need to represent a distinct machine. Multiple nodes can run on the same machine (e.g., one node per core).

Finally, blockchains maintain agreement between participants using a "consensus protocol"—a set of rules that allows nodes to determine when to add new information to the blockchain. Consensus protocols are designed to make the blockchain resistant to tampering and ensure consistency in the data among all participants in the network.

In general, a blockchain is a global append-only log. Writes to the global append-only log are called transactions, and transactions are organized into blocks. Thus, each block can include or package a single transaction or multiple transactions. Writing to the global append-only log (e.g., writing to a block) requires a payment in the form of a transaction fee.

Decentralized Platform

In at least one embodiment, a blockchain network serves as the base of a stack in a decentralized software platform. This blockchain network will be referred to as the base blockchain. The base blockchain can be a public (permissionless) network, in which anyone can join the network, or a private (permissioned) network, which places restrictions on who may participate in the network and in which transactions. The base blockchain can also be a virtual blockchain. A virtual blockchain is a layer that resides on top of a public or private blockchain network. The nodes of the underlying blockchain network are not aware of the presence of virtual blockchains. New operations are defined in the virtual blockchain layer and are encoded in the metadata of valid blockchain transactions. Accordingly, the underlying blockchain nodes receive and store information about the virtual blockchain transactions, but the logic for processing the virtual blockchain transaction only exists at the virtual blockchain level.

Suitable base blockchain networks include Bitcoin, Ethereum, and the STACKS™ blockchain (Blockstack PBC, New York City, N.Y., USA). Preferably, the base blockchain enables users to register and control digital assets like usernames and register/execute smart contracts.

Such a platform can be implemented, for example, for supporting decentralized applications or "DApps." A DApp is different from a traditional world-wide-web-based or other client-server-based application. In this context of this disclosure, DApp is a broad term and includes executable applications and websites that do not require a centralized server to store user information for users of the executable application or website. An example of a DApp is a decentralized microblogging platform, akin to the TWITTER online news and social networking service (Twitter, Inc., San Francisco, Calif., USA), in which users post or interact with short messages. Unlike a centralized system, once a user publishes a message with the microblogging DApp, the message cannot be erased by anyone except the user, including by the company that created the DApp. This is because the DApp provider does not have centralized control over the user's (or any other user's) messages.

In certain embodiments, the blockchain stores information about the user which can be used to authenticate the user. After logging in to the platform with a username, a user can use the same username to interact with multiple DApps on the platform, irrespective of which entity created or maintains the DApp. For example, after logging in with a username, a user can use the same username for buying books online from one entity's DApp ("App1") and to post on social media provided by a different entity's DApp ("App2"). The creator/administrator of the platform can be different from both the creators/administrators of App1 and App2.

Illustrative Operating Environment

Individual blockchain transactions cannot hold much data, often on the order of single-digit kilobytes or less, depending on the base blockchain. Off-chain backend data storage linked to a blockchain can increase the amount of storage available to DApps to multiple terabytes, petabytes, or greater. Aspects of an example implementation of such an off-chain storage system are described in U.S. Patent Application Publication No. 2017/0236123 to Ali et al., the disclosure of which is incorporated by reference in its entirety, including the description of the external data storage units in paragraphs 66-75 and FIG. 2.

By implementing off-chain backend data storage, a platform can be beneficially structured such that a user exiting a DApp leaves no data under the DApp's or platform's control because none was stored with the DApp or with the platform creator/administrator. Personal information and data are encrypted and remain under the control of the user.

Figure 2:
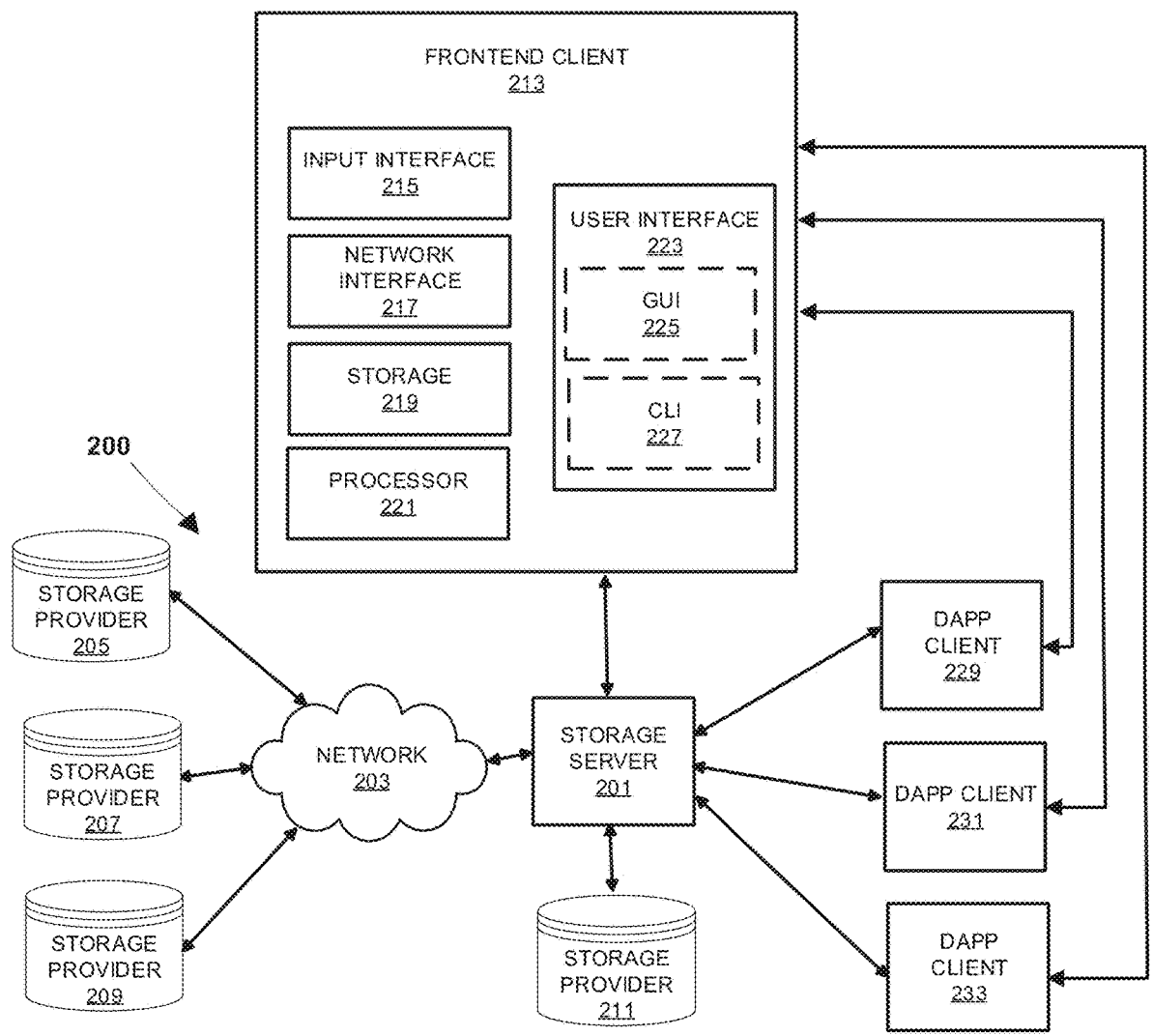
FIG. 2 is a block diagram of an illustrative operative environment in which off-chain decentralized storage is implemented in a blockchain-based network.

FIG. 2 of the present disclosure shows a block diagram of an illustrative operative environment 200 in which off-chain decentralized storage is implemented in a blockchain-based network.

The decentralized storage is embodied in arbitrary backend storage providers 205-211. A backend storage provider 205-211 can be, without limitation, a cloud storage provider, a local disk, or remote storage. Suitable backend storage providers include Amazon S3 (Amazon Web Services, Inc., Seattle, Wash., USA), Google Cloud storage and Google Drive (both by Google LLC, Mountain View, Calif., USA), Dropbox (Dropbox, Inc., San Francisco, Calif., USA), Microsoft Azure (Microsoft Corp., Redmond, Wash., USA), FreeNAS Server (iXsystems, Inc., San Jose, Calif.), FTP, network storage, and local storage. In FIG. 2, for example, storage providers 205 and 207 represent cloud storage, storage provider 209 represents network storage, and storage provider 211 represents 211. The storage server 201 communicates with each storage provider 205-211 via a distinct network connection.

In FIG. 2, the environment 200 further includes a storage server 201 that interfaces with these arbitrary backend storage providers 205-211 either directly (e.g., with storage provider 211) or via a network 203 and exposes a consistent interface to DApp clients 229-233 for storing data to and reading data from these storage providers 205-211. The storage server can be hosted by a third-party provider or by a user of the frontend client 213 discussed below. In at least one embodiment, the storage server 201 writes data as it is provided to it from DApp clients 229-233. The storage server 201 may not offer guarantees about the written data. For example, it may not ensure that the data is validly formatted, contains valid signatures, or is encrypted. These guarantees can be provided by frontend client libraries, discussed later in this disclosure.

The storage server 201 also interfaces with one or more frontend clients 213. A frontend client 213 is a computing device that can allow a user to manage storage of the user's profile and application data and find and launch DApps. A frontend client 213 includes one or more input interfaces 215, one or more network interfaces 217, a local storage 219, and a processor 221. The user interface 215 is configured to receive data, including private key data sufficient to identify a parent private key of a user. For example, the private key data can represent a 12-24 word mnemonic or the parent private key itself. The one or more network interfaces 217 are configured to couple the frontend client 213 to the storage server 201 and the DApp clients 229-233. The frontend client 213 also includes a user interface 223 capable of displaying a graphical user interface 225, a command line interface 227, or both. The local storage 219 (including a non-transitory computer readable storage medium storing program instructions) and the hardware processor 221 function together such that the hardware processor 221 executes the program instructions stored by the local storage 219, which causes the frontend client 213 to perform certain actions.

User Authentication Overview

User accounts are important for many Internet applications. Most Internet users are familiar with the concept of logging into an application, such as a website, using a username and password. The username and password can be used to authenticate the user using an authentication process. If the application maintains a user database, the application can authenticate the user with the password and sometimes a second factor. If the application relies on a third-party identity service, such as Google Authenticator (Google LLC, Mountain View, Calif., USA) or Facebook Login (Facebook, Inc., Menlo Park, Calif., USA), the application will use the OAuth protocol to obtain an assertion from that identity service. These existing approaches remove control of the process from the users themselves. Furthermore, with the proliferation of centralized applications requiring login information, a user may be responsible for remembering dozens, if not hundreds, of username and password combinations.

This disclosure encompasses the inventive realization that, in a decentralized system, authentication can be performed by the user's frontend client, instead of a centralized server. This disclosure also encompasses the realization that a decentralized protocol can provide users with a universal username that works across all DApps with one login. This disclosure also provides an inventive protocol for decentralized authentication for DApps. This protocol can enable users to authenticate using identities under the user's control.

Instead of password-based authentication, users of the inventive decentralized system can authenticate via public-key cryptography. The frontend client can receive sign-in requests from DApps and sign authentication requests. In at least one embodiment, authentication comprises cryptographically signing a statement proving control over a username that has been anchored to the underlying blockchain. The requesting DApps can independently verify these proofs.

In example embodiments discussed below, authentication can, from a DApp user's perspective, resemble third-party authentication services, such as OAuth, that the user is accustomed to using on the Internet. But the underlying data flow is unlike the client-server data flow of these third-party authentication services. For example, unlike OAuth, the authentication flow can be implemented on the frontend client, without need for a centralized server. In at least one embodiment, the authentication flow provides a single login for all DApps, where each DApp does not store personal information for the user relating to the login, and no centralized server stores such personal information. This configuration is fundamentally different from OAuth authentication services.

In at least one embodiment, a DApp and the frontend client user interface communicate during authentication by exchanging tokens. The DApp sends the frontend client user interface a request token. After a user approves the request (e.g., a request to sign in), the frontend client user interface responds to the DApp with a response token. These tokens can be, for example, based on JSON web tokens. The request and response tokens can be passed via URL query strings.

More specifically, in at least one embodiment, when a user chooses to sign in to a DApp, a redirect method sends the user to the frontend client user interface. The frontend client user interface responds with the response token and a DApp-specific private key. A description of DApp-specific private keys and systems and methods for generating DApp-specific private keys is provided in U.S. patent application Ser. No. 16/555,632 (entitled MIGRATING DATA FOR DECENTRALIZED APPLICATIONS BETWEEN DISPARATE BACKEND STORAGE PROVIDERS) and U.S. patent application Ser. No. 16/555,541 (entitled BACKUP OF ENCRYPTED INFORMATION STORED OFF-CHAIN IN A BLOCKCHAIN-BASED DECENTRALIZED STORAGE SYSTEM), both filed Aug. 29, 2019, the disclosures of which are incorporated by reference in their entirety as if set forth herein. In at least one embodiment, the DApp-specific private key can be generated from the parent private key of the user (discussed above) using an identifier of the DApp as input. Suitable identifiers include, for example, a name, domain, or uniform resource indicator (URI) corresponding to the DApp. The DApp-specific private key is preferably deterministic, meaning that, for a given user and DApp identifier, the same DApp-specific private key is generated each time. The DApp-specific private key can be shared securely with the DApp on each authentication, for example, after encryption with the frontend client user interface.

The DApp-specific private key serves functions including, but not limited to, 1) creating the credentials that give a DApp access to a DApp-specific location on the storage server; 2) end-to-end encryption of files stored for the DApp via the storage server on the backend storage provider; 3) serving as a cryptographic secret that a DApp can used to perform other cryptographic functions.

When a DApp writes to the backend storage provider via the storage server, the response token, DApp-specific private key, and the data to be written are passed to the storage server. The response token, received by the storage server, ensures that the DApp has the authorization to write to the backend storage provider on the user's behalf. As discussed in greater detail below, embodiments of the authentication protocol therefore connect DApps with the user's storage server and any DApp-specific private keys.

Single Sign on

The inventive authentication protocol preferably uses public-key cryptography for authentication. The user signs into a DApp to give the DApp the ability to generate and store signed data. In at least one embodiment, the authentication functionality runs on the user's frontend client, e.g., in the form of an authenticator DApp. The authentication functionality does not run on a centralized server, controlled by a third-party entity, that stores personal information.

Figure 3:
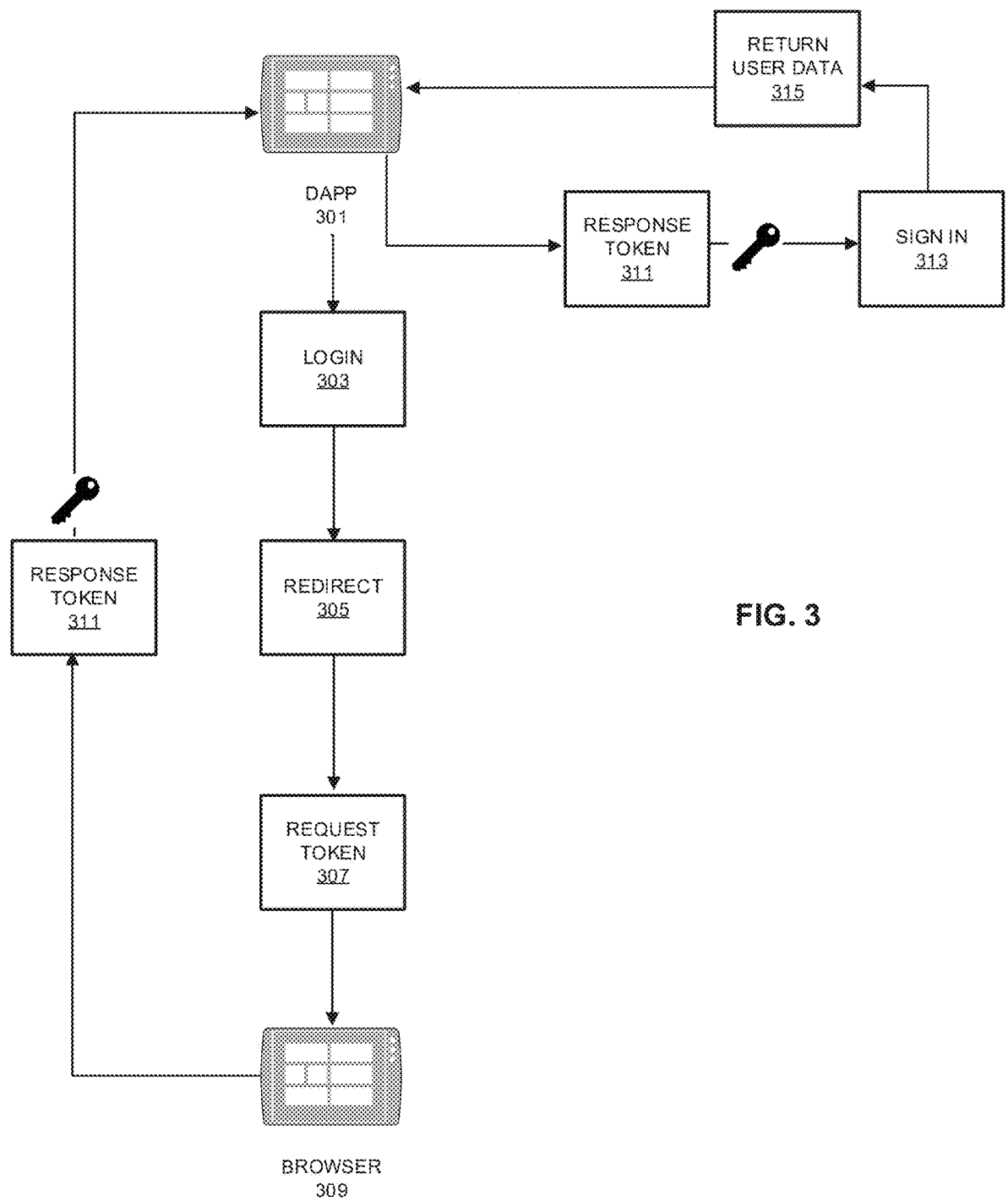
FIG. 3 is a block diagram showing an illustrative authentication flow according to at least one embodiment.

With reference to the block diagram of FIG. 3, a user can sign into a DApp 301 by clicking a "login" button 303. In block 305, the DApp (via an application programming interface or software development kit) redirects the user to an authenticator DApp (distinct from the requesting DApp) with a request to sign in. The authenticator DApp can be executed by the frontend client user interface and displayed, for example, in a decentralized browser 309. The user is presented with the choice of IDs to sign in. In at least one embodiment, these IDs are stored in a blockchain and can be retrieved from a node of a blockchain-based network, a core node/peer of a blockchain-based network (as described in U.S. Patent Application Publication No. 2017/0236123 to Ali et al., incorporated above). Other sources of IDs are discussed below, in the disclosure relating to subdomain registrars. To allow for such access, the user can provide the frontend client with the network address of a predetermined blockchain node address or peer address on sign-in. The user can also be presented with a list of which permissions the requesting DApp needs from the user.

The DApp 301 sends the frontend client user interface 309 a request token 307. After a user approves the request (e.g., a request to sign in), the frontend client user interface responds to the DApp with a response token 311.

More specifically, after the user selects an ID, the authenticator DApp 309 redirects the user to the requesting DApp 301, passing the requesting DApp information including, but not limited to: 1) the username corresponding to the selected ID or a hash of the public key associated with the selected ID; 2) a requesting DApp-specific private key for encrypting and signing the user's data; and 3) a resource identifier on the storage server corresponding with a resource on the user's backend storage provider.

By providing the requesting DApp with the user's username and the location where the user's data can be found and stored, the DApp can read and write DApp-specific data persistently, without needing to provide a DApp-specific storage or identity. For example, when requesting user data from the storage location, the DApp 301 can pass the response token 311 to the storage location and sign into 313 the storage location with the DApp-specific private key. In response, the storage location can provide user data 315 to the DApp 301. Signing out of a DApp can clear the DApp's local state and cause the user interface of the frontend client, which presents the DApp to the user, and also the DApp client to forget the DApp-specific private key between logins.

This disclosure includes the inventive realization that, when user IDs are registered on a blockchain, and the frontend client can access, query, and read from the blockchain, and each DApp and authenticator DApp can have an up-to-date view of 1) all user IDs that exist within the decentralized system, and 2) all of their public keys and associated storage. This inventive realization obviates the need for a server-side identity provider.

User Experience Flow

Figure 4:
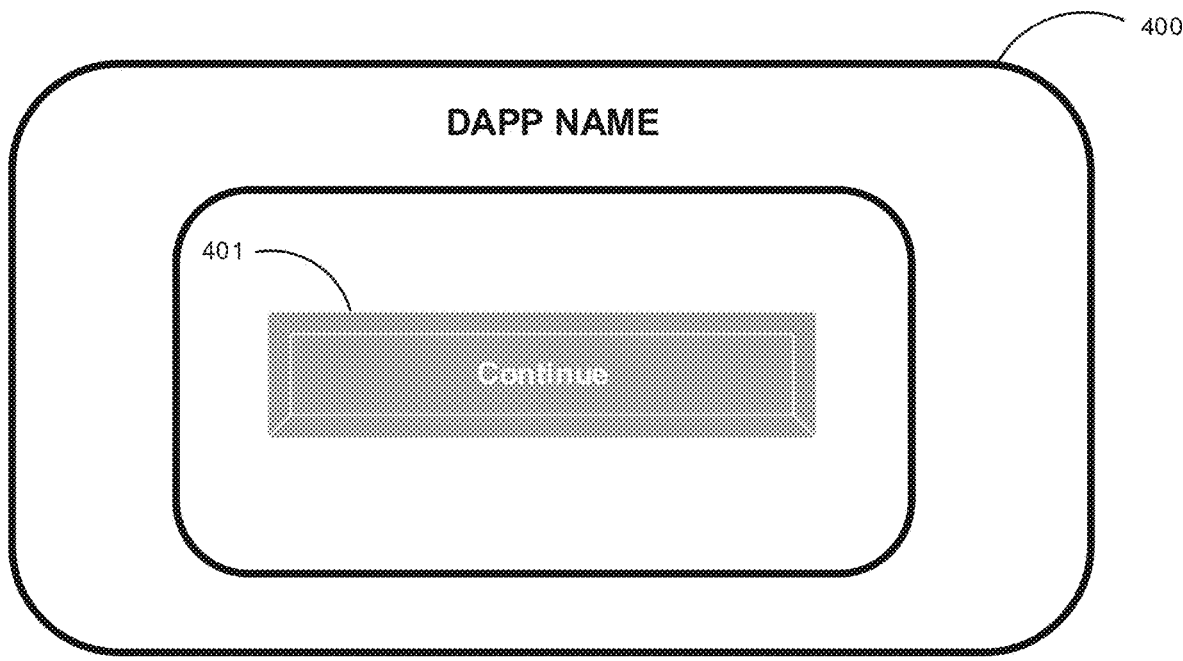
FIG. 4 is a schematic of a login dialog displayed in a graphical user interface.

From a DApp user's perspective, the authentication experience can appear like a legacy third-party authentication services that users are familiar with. A frontend client user interface can display a DApp to a user. If the user has not yet signed into the DApp, the frontend client can present the user with a "login" button, such as the "continue" button 401 shown in the user interface dialog 400 of FIG. 4. When the user clicks the login button, the user can be redirected to a browser session in the user interface of the frontend client.

The user grants the DApp access by signing in with an identity. Access depends on the scope requested by the DApp. Scope refers to the extent of permission. Example scopes are provided below. The default store_write scope allows the DApp to read the user profile and read user data from and write user data to the backend storage provider on the user's behalf. Data can be encrypted at a unique URL on the storage server.

Figure 5:
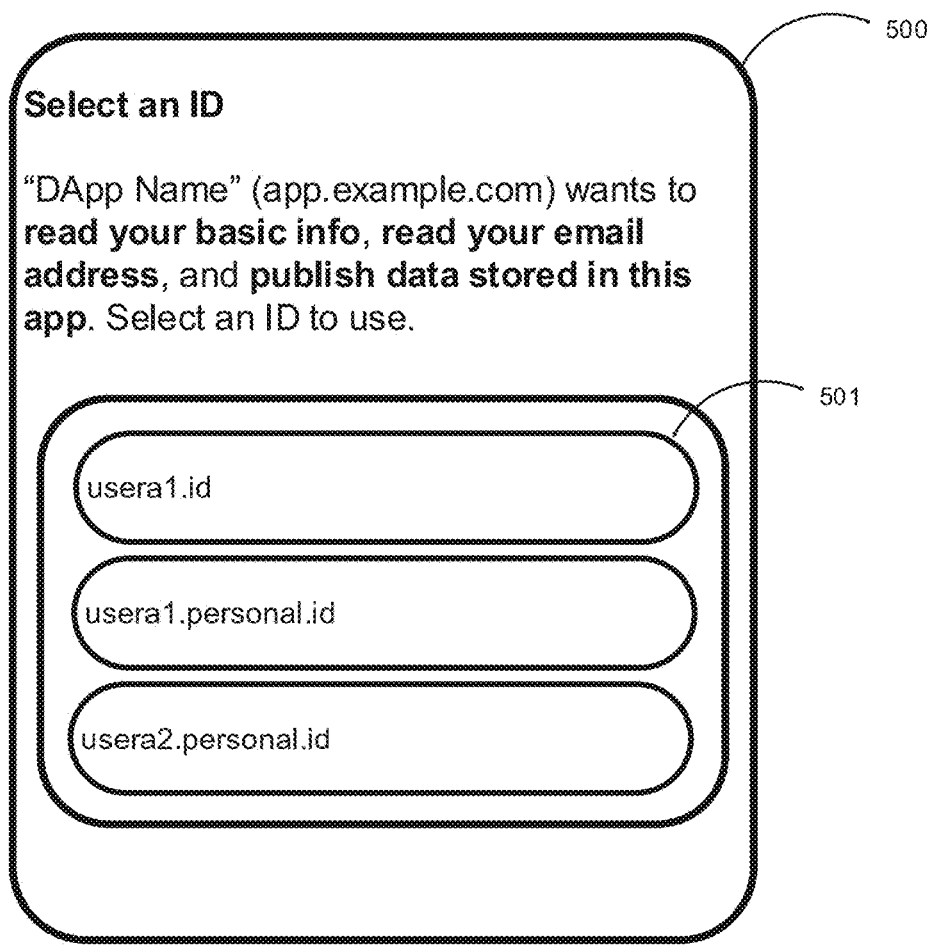
FIG. 5 is a schematic of a user ID selection dialog displayed in the graphical user interface.

The user can choose to authenticate and sign into the DApp with one of the user's IDs by selecting the ID. FIG. 5 shows an example dialog 500 for a user interface that allows the user to select a user ID 501 via a selection icon. The browser running in the frontend client user interface shows the user an approval dialog with information about the access the DApp requests, such as: 1) the origin the DApp was served from; 2) the DApp's name; 3) the DApp's logo; and 4) the types of permissions and data the DApp is requesting. When the user chooses an ID (or creates a new one), the user is redirected back to the DApp where the user is now logged in.

Figure 6:
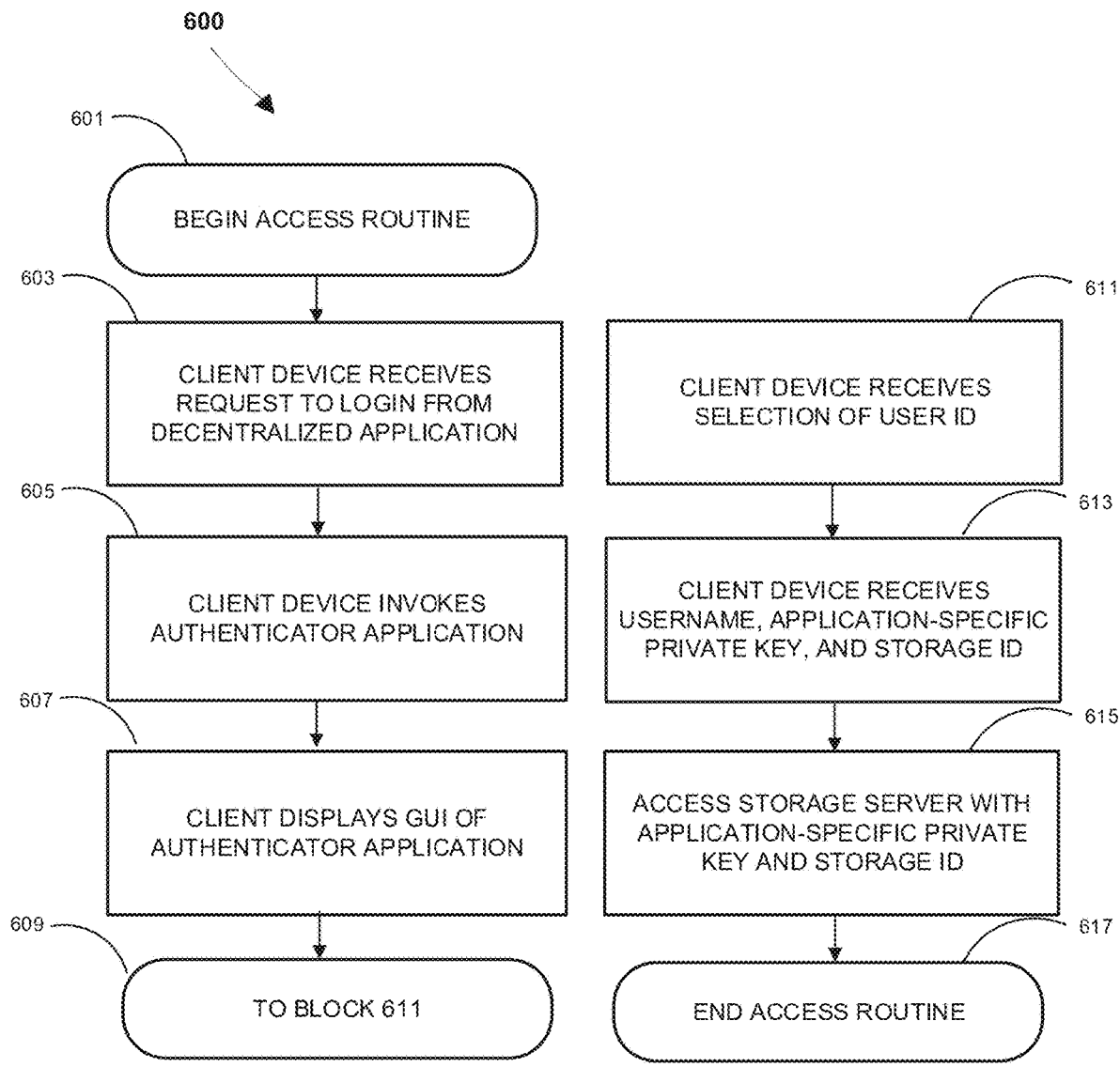
FIG. 6 provides an access routine according to at least one embodiment.

FIG. 6 shows an embodiment of an example access routine 600. The routine begins in block 601. In an example embodiment, a client computing device of a blockchain-based decentralized network comprises a network interface configured to couple the client computing device to a storage server configured to store data specific to a user and a decentralized application, the stored data being available for use by the decentralized application; a display; a hardware processor; and a non-transitory computer readable storage medium storing program instructions for execution by the hardware processor. The program instructions can cause the client computing device to receive from an instance of a decentralized application executed on the client computing device a request to login initiated by a first user selection of a graphical button displayed on the display in a first graphical user interface of the decentralized application, as shown in block 603. In response to the received request, the client computing device can invoke an authenticator application that is distinct from the decentralized application for execution by the client computing device, as shown in block 605. In block 607, with the display, the client computing device displays a second graphical user interface of the authenticator application, the second graphical user interface configured to display one or more user IDs associated with the authenticator application. In block 611, the client computing device receives from the authenticator application a second user selection comprising a selected ID of the one or more IDs. In block 613, in response to the received selected ID, the client computing device receives from the authenticator application a username associated with the received selected ID, an application-specific private key that is specific to the decentralized application, and a storage server identifier associated with the username. In block 615, with the decentralized application, the client computing device accesses the storage server for read and write access with the decentralized application-specific private key and the storage server identifier. The routine ends in block 617.

DApp Authentication Flow

A DApp and a browser or other instance of the frontend client user interface communicate during the authentication flow by passing back and forth two tokens. The requesting DApp sends the browser a request token. Once a user approves a sign-in, the browser responds to the requesting DApp with a response token. These tokens can be related to JSON Web Tokens (JWT), and they can be passed via URL query strings. Example payloads for the request token and the response token are respectively provided in Examples 1 and 2 below.

const requestPayload={
  jti, // UUID (universally unique identifier)
  iat, // JWT creation time in seconds
  exp, // JWT expiration time in seconds
  iss, // legacy decentralized identifier generated from transit key
  public_keys, // single entry array with public key of transit key
  domain_name, // app origin
  manifest_uri, // url to manifest file—hosted on dapp origin
  redirect_uri, // url to which browser redirects user on authentication approval—hosted on dapp origin
  version, // version tuple do_not_include_profile, // a boolean flag asking browser to send profile url instead of profile object
    supports_hub_url, // a boolean flag indicating storage server support
    scopes // an array of string values indicating scopes requested by the app
}

Example 1

```
const responsePayload={
  jti, // UUID
  iat, // JWT creation time in seconds
  exp, // JWT expiration time in seconds
  iss, // legacy decentralized identifier (string prefix+identity address)—this uniquely identifies the user
  private_key, // encrypted private key payload
  public_keys, // single entry array with public key
  profile, // profile object or null if passed by profile_url
  username, // id username (if any)
  core_token, // encrypted core token payload
  email, // email if email scope is requested & email available
  profile_url, // url to signed profile token
  hubUrl, // url pointing to user's storage server
  version // version tuple
}
```

Example 2

When a user chooses to login to a DApp, the DApp can call a method that generates an authentication request and redirects the user to the browser to approve the sign in request. The authentication request can be passed as a request token via a URL query string.

When the browser receives the request, the browser can generate a response token to the DApp using an ephemeral transit key, generated and stored by the DApp. The ephemeral transit key is used solely for the particular instance of the DApp. The browser uses the public portion of the transit key to encrypt the DApp-specific private key which is also returned via the response token. As discussed above, during sign in, the browser generates the DApp-specific private key from the user master private key and the information specific to the DApp, such as the DApp domain.

Figure 7:
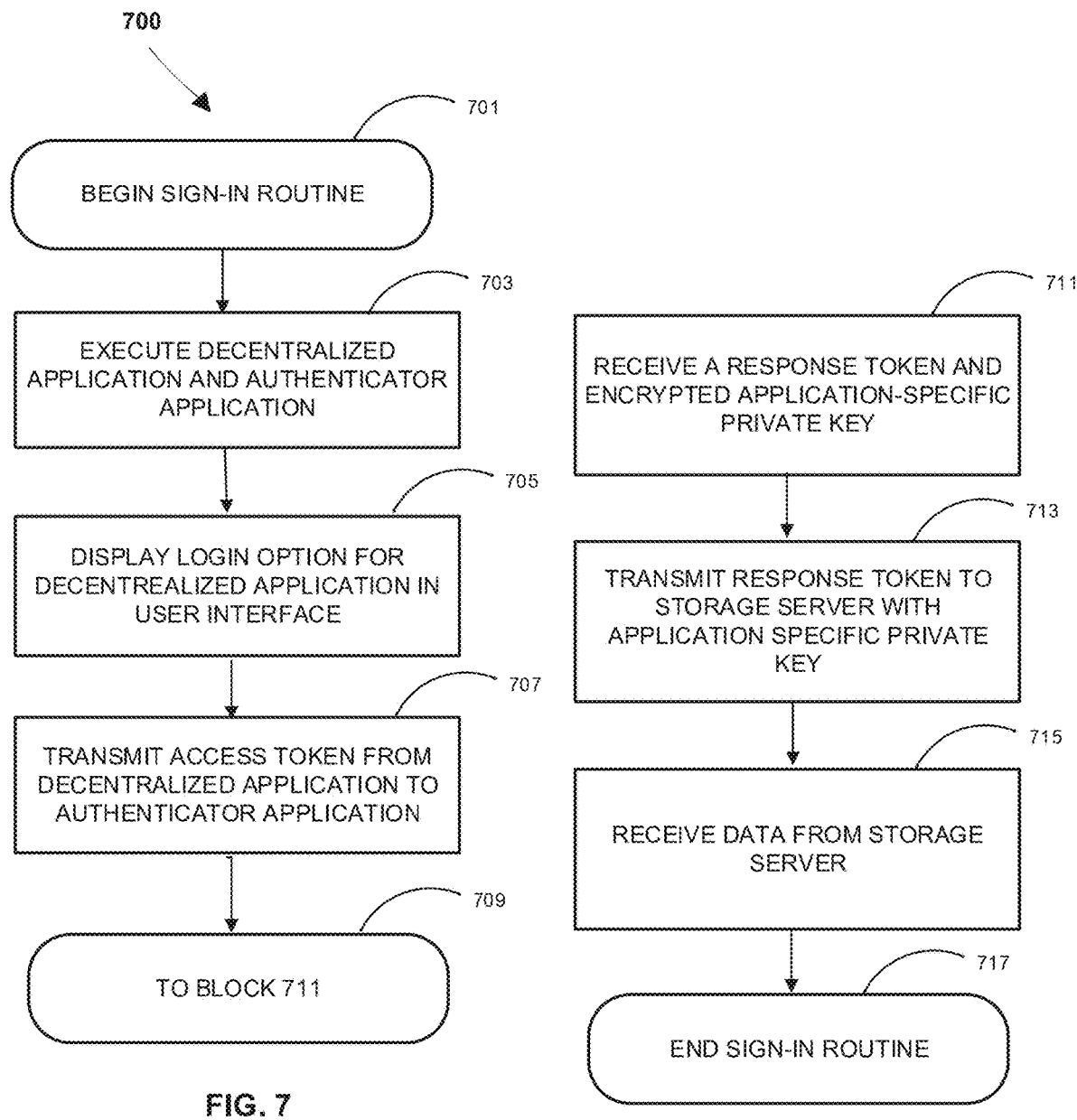
FIG. 7 provides a sign-in routine according to at least one embodiment.

FIG. 7 provides an example login routine 700. In an example embodiment, a client computing device of a decentralized network comprises a network interface configured to couple the client computing device to a storage server; a display; a hardware processor; and a non-transitory computer readable storage medium storing program instructions for execution by the hardware processor. The program instructions can cause the client computing device to execute a first session of a decentralized application and a second session of an authenticator application distinct from the first session, the authenticator application having access to a top-level private key specific to a user and the decentralized application having no access to the top-level private key, as shown in block 703. In block 705, the client computing device displays in a first user interface a login option for the first session of the decentralized application. In block 707, in response to a user selection to login from the login option, the client computing device transmits via a first URL query string from the first session of the decentralized application, an access token to the second session of the authenticator application, the access token authorizing the decentralized application to read data from the storage server on behalf of the user. In block 711, the client computing device receives via a second URL query string from the authenticator application a response token and an encrypted application-specific private key derived from the top-level private key and an identifier specific to the decentralized application. In block 713, the client computing device transmits the response token to the storage server with the application-specific private key, the application-specific private key providing access to a storage location on the storage server that is configured to store data that is specific to the user and the decentralized application. In block 715, the client computing device receives the data from the storage server. The routine ends in block 717.

Scopes

Scopes define the permissions requested from, and that a user accepts, through the sign-in dialog. DApps may request the scopes shown in Table 1. These scopes are provided as a non-limiting example.

TABLE 1

| Scope | Description |
| --- | --- |
| store_write | Read and write data to the user's backend storage provider in a DApp-specific data locker, via the storage server. |
| publish_data | Publish data so that other users of the DApp can discover and interact with the user. |
| email | Requests the user's email if available |

The permissions scope (if different from store_write) should be specified through a DApp configuration object.

Key Pairs

The authentication process uses public key cryptography. An example implementation uses ECDSA (elliptic curve digital signature algorithm) with the secp256k1 curve, representing the curve $y^2=x^3+7$ over a finite field (the Galois field) mod p where $p=2^{256}-2^{32}-997$. The following sections describe the three public-private key pairs used in the authentication process and notes how they are generated; where they are used; and to whom the private key is disclosed.

Transit Private Key

The transit private is an ephemeral key that is used to encrypt secrets that need to be passed from the browser to the DApp during the authentication process. It is randomly generated by the DApp at the beginning of the authentication response.

The public key that corresponds to the transit private key is stored in a single element array in the public_keys key of the authentication request token (Example 1, above). The browser encrypts secret data such as the DApp-specific private key using this public key and sends the public key back to the DApp when the user signs in to the DApp. The transit private key signs the DApp authentication request.

User Private Key

The user private key (the top-level or master private key) is derived from the user's mnemonic and is the user private key of the ID that the user chooses to use to sign in to the DApp. It is a secret owned by the user and never leaves the user's instance of the browser. This user private key, for example, signs the authentication response token for a DApp to indicate that the user approves sign in to that DApp.

DApp-Specific Private Key

The DApp-specific private key is generated from the user private key using a DApp identifier, such as the domain name, as input. It is deterministic in that, for a given ID and DApp identifier, the same DApp-specific private key is generated each time. The DApp-specific private key is securely shared with the DApp on each authentication, encrypted by the browser with the transit public key.

JSON Web Token Signatures

Both the authentication request and response tokens are JSON Web Tokens, and they can be passed via URL query strings. Example authentication tokens can be based on the RFC 7519 OAuth JSON Web Token (JWT) with modification by additional support for the secp256k1 curve. The modified JWT implementation is different from other implementations, for example, because of the underlying cryptography.

ID Creation and Subdomain Registrar

As discussed above, an underlying blockchain can be used to register names used in a decentralized authentication system. While a blockchain-based system beneficially allows for user-centric control of the user's personal data, incorporating a blockchain also presents a difficulty. Registering a name (such as UserA.ID) on a blockchain can takes a long time to confirm. When the underlying blockchain is the Bitcoin blockchain, for example, the unconfirmed transaction to register this name will go into the Mempool. The miner who mines the next Bitcoin block will pick up this unconfirmed transaction, mine the transaction, and the transaction gets included in the next block. A new Bitcoin block is generated roughly every 10 minutes. Therefore, the new name will not be available for query on the blockchain for at least 10 minutes.

Practically speaking, however, the delay between registering a name and the time the name is available for querying can be much longer than 10 minutes. Bitcoin works on a principle called "longest chain." Two miners can find valid blocks within a few seconds of each other and broadcast them to the network. If this occurs, two chains will temporarily exist, each having the same length, but different end blocks. Some Bitcoin nodes will see the first miner's chain and some will see the second miner's chain. Another miner finds another valid block and will append it to one of the co-existing chains. This chain is now the longest chain, and nodes will follow that active chain. The transactions in the alternate chain that are not in the active chain are returned to the Mempool of unconfirmed transactions to be included in a subsequent block of the active chain. Because of the possibility that a mined transaction may not be incorporated in the active chain, a robust system would not consider a block to be "confirmed" unless there have been six or more blocks after that block in the chain (because the chance two nodes disagree about blocks in the past decreases exponentially as they are older). This additional delay means that the system could take up to an hour or more to confirm a name on the blockchain. This is a problem when a user wants to register and name and use it instantly.

This disclosure includes the inventive realization that a subdomain registrar can beneficially allow a user with registered name to register names for other users. These registered names can be stored off-chain. As discussed below, the inventive subdomains allow a system with name registrations stored to a blockchain to provide names to end users quickly and inexpensively. In general, the inventive subdomain system allows domains to delegate subdomains to particular keys permanently and cryptographically, relinquishing the domains' ability to revoke the names or change the name resolution details. The state and owner of a subdomain are stored outside the blockchain, but the existence and operation history are anchored to the blockchain. Like their on-chain counterparts, subdomains are globally unique and human readable.

Through the browser, UserB can create a request to register a name and send the request to a registrar with a domain name (such as UserA.ID) that has been previously registered on the blockchain. The registrar can be implemented as a web server that accepts name registration requests. The registrar can be configured to accept all registration requests or a subset of requests as defined by the web server.

For example, if a registrar is running a web server and is associated with the registered name UserA.ID, that registrar can register additional usernames ending in UserA.ID. Multiple users can send requests to the registrar associated with UserA.ID. Before submitting any registration transactions to the underlying blockchain, the registrar associated with UserA.ID can wait until the registrar has a predetermined number of requests (e.g., 20, 25, 50, 75, 100, or 120 requests) queued up to register new IDs. The registrar can create a zone file of all pending IDs related to the requests, run the zone file through a hash function to generate a hash, and send one transaction to register all the IDs. The registrar associated with UserA.ID will store a zone file specific to UserA.ID and will also store zone files for all other users registered by UserA.ID.

The cost of registering one name per transaction on the Bitcoin network is the cost of one transaction. With the foregoing batching approach for subdomains of a registrar, the domain registrar combines requests for multiple subdomain users into one transaction. Assuming the cost of a transaction on the Bitcoin blockchain is $10, 50 names could be registered at a cost of $0.20 per name. Therefore, a registrar can register names more cheaply than an approach that registers one name per transaction.

The foregoing approach not only has a benefit of being less expensive than registering one name per transaction, but also allows a subdomain ID to be usable immediately. A DApp that wants to validate UserB.UserA.ID can first request the authenticating information otherwise available from the blockchain from the UserA.ID registrar. Even though the UserB ID has not been confirmed on the blockchain yet, UserA.ID has kept track of all the IDs that are pending, so when a DApp requires authenticating information, UserA.ID can vouch for UserB.UserA.ID and provide information regarding where UserB.UserA.ID is storing data on the backend storage provider via the storage server. UserA.ID can also vouch for UserB's public key until the NAME_UPDATE confirms and the zone file containing UserB's public key is replicated to the peer network.

As discussed above, IDs stored in a blockchain can be retrieved from a node or a core node of a blockchain-based network. The frontend client can query ID information from the node or core node via an API and retrieve the requested information via an API call. The queried node or core node can look up on the blockchain the information associated with UserA.ID. The registrar associated with UserA.ID, defined on the blockchain, can internally store a database of the IDs it has registered, or at least the pending IDs that have not been confirmed on the blockchain. After receiving a request for a subdomain associated with UserA.ID (e.g., for UserB.UserA.ID), the UserA.ID registrar can run a database query, look up UserB, and find the location where the UserB profile information is stored, load the UserB profile information, and then return the profile information to the program or the user that requested from this API. Alternatively, the registrar for UserA.ID can return the public key and storage URL for UserB.UserA.ID. The client can then use this information to fetch and authenticate the profile. For a name, such as UserB, that has not been confirmed on the blockchain (e.g., with six additional blocks after the block), normally the node or core node would not save that name into its local database. But in the case of a subdomain, because UserB.UserA.ID is known to be a subdomain of UserA.ID, e.g., because UserB.UserA.ID is structured as a subdomain (UserB) of a domain (UserB) associated with a top-level domain (ID), and because the UserA.ID registrar is known to store UserA's zone file or profile information, the UserA.ID registrar can be queried to determine whether the UserB subdomain exists. Querying UserB.UserA.ID, instead of looking up on the blockchain or in the node/core node database, actually looks up UserB's information from the registrar at UserA.ID.

Accordingly, when a lookup for UserB.UserA.ID is received at the registrar's resolver, the resolver can: 1) lookup the zonefile history of UserA.ID; 2) fetch all the zonefiles and filter by operations on UserB; 3) verify that all UserB operations are correct; 4) return the latest record for UserB; and 5) do a profile lookup for UserB.UserA.ID by fetching the URLs in the entry. Again, the resolver can cache a subdomain's state by keeping a database of all current subdomain records. This database can be automatically updated when a new zonefile for a particular domain is seen by the resolver.

As discussed above, a zone file records each subdomain (i) containing one, some, or all of following information: 1) an owner address (addr); 2) a sequence number (N); 3) a zonefile; and 4) a signature S of the above. The signature Si is verifiable with the address in the $(N-1)^{th}$ entry for the subdomain i.

A subdomain registration system can be achieved by storing subdomain records in a peer-to-peer content-addressed storage system, as described in U.S. Patent Application Publication No. 2017/0236123 to Ali et al., incorporated above. An on-chain name owner can broadcast subdomain operations by encoding them as TXT records within a zone file. To broadcast the zone file, the name owner can set the new zone file hash with NAME_UPDATE transaction and replicate the zone file via the peer-to-peer storage system. This can, in turn, replicate all subdomain operations the zone file contacts and anchor the set of subdomain operations to an on-chain transaction.

Each TXT record in the zone file can encode a subdomain creation. In a nonlimiting embodiment, the format of RFC 1464 (incorporated here by reference) can be utilized for the TXT entry. The format can include the strings with identifiers, as shown in Table 2.

TABLE 2

| String | Description |
| --- | --- |
| owner | the owner address delegated to operate the subdomain |
| seqn | the sequence number |
| parts | TXT strings can only be 255 bytes, so the zonefile can be split into pieces. This specifies the number of pieces that the zonefile has been split into. |
| z-f{n} | part n of the zonefile, base64 encoded |
| sig | signature the above data |

Example 3 below shows a zonefile that incorporates strings introduced in Table 2, except for the sig string. In this example, $ORIGIN represents the blockchain ID associated with UserA. The $TTL field is how long a client can cache the zone file (in seconds). The pubkey line identifies the ECDSA public key that will be used to authenticate off-chain data. The registrar line indicates how to contact the registrar service for clients of the domain wishing to register or modify the entry.

$ORIGIN usera.id
$TTL 3600
pubkey TXT
"pubkey:data:
0000000000000000000000000000000000000000000000
0000000000000000000000000000000000000000000000
00000000000000000000000000000000 000"
registrar URI 10 1 "reg://userb.com:8234"
userb TXT
  "owner=33VvhhSQsYQyCVE2VzG3EHa9gfRCpboq
    Hy"
  "seqn=0"
  "parts=1"
  "zf0=JE9SSUdJTiBhYXJvbgokVFRMIDM2MDAKb
    WFpbiBVUkkgMSAxICJwdWJrZXk6ZGF0YTow
    MzAyYWRlNTdlNjNiMzc1NDRmOGQ5Nzk4NjJh
    NDlkMDBkYmNlMDdmMjkzYmJlYjJhZWNm
    ZTI5OTkxYTg3Mzk4YjgiCg=="

Example 3

Information such as the UserB subdomain's address, blockchain type, last transaction ID, status, zonefile hash, and zonefile TXT can be extracted from the TXT resource record in the zone file for UserA.ID. A subdomain can, and preferably does, have a different public key hash (address) than its parent domain.

After receiving subdomain registrations (e.g., using a POST request through the API), the registrar can check of the subdomain userb exists already on the domain usera.id and, if it does not, add the subdomain to the queue. When the registrar wakes up to prepare a transaction (e.g., because a predetermined time period has elapsed or because the queue includes a predetermined number of subdomains), the registrar can pack the queued registrations together and issue an UPDATE via the API.

Preferably, a node may only process a subsequent subdomain operation on UserB.UserA.ID if it includes a signature from this address's private key. UserB.ID cannot generate updates; only the owner of UserB.UserA.ID can do so. In addition, unlike an on-chain name, a subdomain owner needs an on-chain name owner's help to broadcast their subdomain operations. In particular, a subdomain-creation transaction can only be processed by the owner of the on-chain name that shares its suffix. For example, only the owner of UserA.ID can broadcast subdomain-creation transactions for subdomain names ending in .UserA.ID. Subdomains and registrar domains can also have one, some, or all of the following properties. A subdomain-transfer transaction can only be broadcast by the owner of the on-chain name that created it. For example, the owner of UserB.UserA.ID needs the owner of UserA.ID to broadcast a subdomain-transfer transaction to change UserB.UserA.ID's public key. In order to send a subdomain-creation or subdomain-transfer, all of an on-chain name owner's zone files must be present in the peer-to-peer network. This lets the node or core node prove the absence of any conflicting subdomain-creation and subdomain-transfer operations when processing new zone files. A subdomain update transaction can be broadcast by any on-chain name owner, but the subdomain owner needs to find one who will cooperate. For example, the owner of UserA.ID can broadcast a subdomain-update transaction created by the owner of Foo.Bar.ID.

But, again, to create a subdomain, the subdomain owner generates a subdomain-creation operation for their desired name and gives it to the on-chain name owner. The on-chain name owner then uses the peer-to-peer network to broadcast it to all other nodes/core nodes.

Once created, a subdomain owner can use any on-chain name owner to broadcast a subdomain-update operation. To do so, they generate and sign the requisite subdomain operation and give it to an on-chain name owner, who then packages it with other subdomain operations into a zone file and sends them all out on the peer-to-peer network.

If the subdomain owner wants to change the address of their subdomain, they need to sign a subdomain-transfer operation and give it to the on-chain name owner who created the subdomain. They then package it into a zone file and broadcast it.

Figure 8:
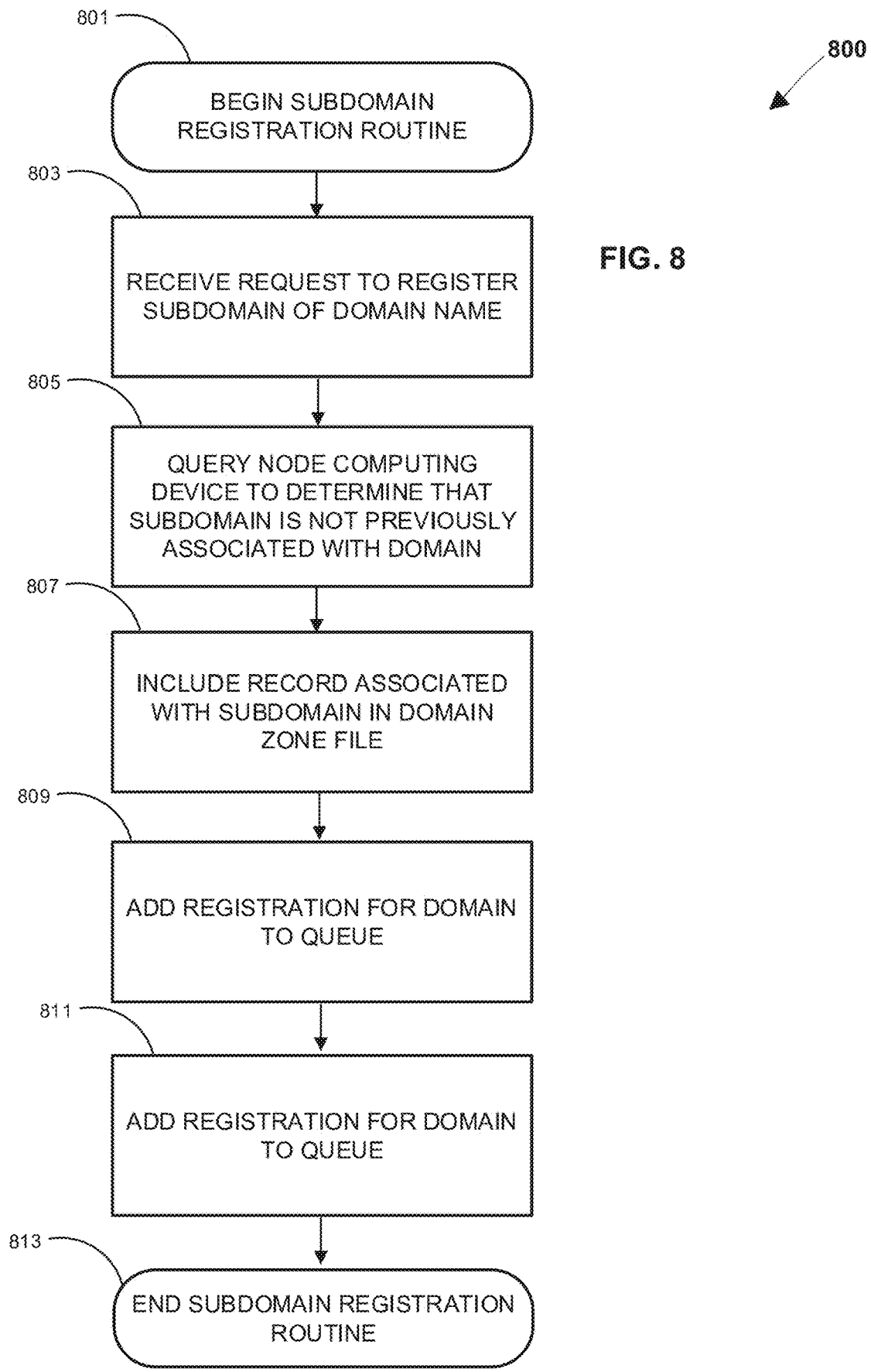
FIG. 8 provides a subdomain registration routine according to at least one embodiment.

FIG. 8 shows a routine 800 for registering a subdomain. The process begins in block 801. A registrar server computing device associated with a domain name in a blockchain-based domain naming system can comprise a network interface configured to communicate with a node computing device configured to store a mirrored subset of data associated with the domain name that is also stored on a blockchain and a domain zone file associated with the domain name; a hardware processor; local storage configured to store a second database of records for subdomains of the domain name; and a non-transitory computer readable storage medium storing program instructions for execution by the hardware processor. With the program instructions, the registrar server computing device can, as shown in block 803, receive from a client computing device a request to register a subdomain of the domain name. As shown in block 805, the registrar server computing device can query the node computing device and look up in the second database to determine that the subdomain is not previously associated with the domain name. Block 807 shows that the registrar server computing device can include a record associated with the subdomain in the domain zone file. In block 809, the registrar server computing device adds to a queue a registration for the subdomain. In block 811, the registrar server computing device packs the queued registration together with other registrations of other subdomains of the domain name and issue an update transaction that causes the queued registrations to be registered in a transaction on the blockchain. The process ends in block 813.

System Structure

The system structure can be configured with backend storage providers interacting with frontend applications and storage server providing an interface between the backend storage providers and the frontend applications. As discussed above, these backend storage providers can be any cloud storage, local storage, or network storage provider. A preferred, but non-limiting, embodiment of the storage server is the Gaia™ decentralized storage system (Blockstack PBC, New York, N.Y., USA). The storage server does not have been in the same physical or logical location as the backend storage provider(s), but it could be. The storage server could be running locally. Regarding the frontend client(s), suitable frontend applications include command line interfaces and decentralized web browsers, such as Blockstack CLI and Blockstack Browser (Blockstack PBC, New York, N.Y., USA).

Functions for received and deriving cryptographic keys can be executed at the frontend. Therefore, the frontend client is responsible for receiving the user's private key and deriving the cache-specific private keys. With this configuration, only the user's client application is exposed to private keys. The frontend applications also can perform the iterative steps for deriving each cache-specific private key. The storage server exposes interfaces for reading from and writing to the backend storage providers when DApps unlock the data caches for reading and/or writing. The appropriate backend storage providers respond to these interfaces.

Again, data is stored in whichever backend storage provider the storage server is configured to store them in.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A client computing device of a blockchain-based decentralized network comprising:
   a network interface configured to couple the client computing device to a storage server configured to store data specific to a user and a decentralized application, the stored data being available for use by the decentralized application;
   a display;
   a hardware processor;
   a non-transitory computer readable storage medium storing program instructions for execution by the hardware processor in order to cause the client computing device to:
   receive from an instance of a decentralized application executed on the client computing device a request to login initiated by a first user selection of a graphical button displayed on the display in a first graphical user interface of the decentralized application;
   in response to the received request, invoke an authenticator application that is distinct from the decentralized application for execution by the client computing device;
   with the display, display a second graphical user interface of the authenticator application, the second graphical user interface configured to display one or more user IDs associated with the authenticator application;
   receive from the authenticator application a second user selection comprising a selected ID of the one or more IDs;
   in response to the received selected ID, receive from the authenticator application a username associated with the received selected ID, an application-specific private key that is specific to the decentralized application, and a storage server identifier associated with the username;
   with the decentralized application, access the storage server for read and write access with the decentralized application-specific private key and the storage server identifier;
   receive from the decentralized application or from the authenticator application a request to logout; and
   clear a local state of the decentralized application such that the decentralized application and the authenticator application do not store and have no access to the decentralized application-specific private key.

2. The client computing device of claim 1, wherein the first graphical interface is configured to display data-access permissions requested by the decentralized application.

3. The client computing device of claim 1, wherein the second graphical user interface is a browser comprising navigation icons and a display area configured to display graphics and human-readable content.

4. The client computing device of claim 1, wherein the one or more IDs are stored in a local storage of the client computing device and accessible for reading by the authenticator application.

5. The client computing device of claim 1, wherein invoking the authenticator application comprises opening a session of the authenticator application when no session is currently open.

6. The client computing device of claim 1, wherein invoking the authenticator application comprises switching to an open session of the authenticator application.

7. The client computing device of claim 1, wherein the non-transitory computer readable storage medium further stores program instructions for execution by the hardware processor in order to cause the client computing device to derive, with the authenticator application, the decentralized application-specific private key based on a top-level private key associated with the IDs and an identifier of the decentralized application.

8. The client computing device of claim 1, wherein the network interface is further configured to couple the client computing device to a blockchain core node associated with nodes of the blockchain-based decentralized network that are distinct from the core node, and wherein the non-transitory computer readable storage medium further stores program instructions for execution by the hardware processor in order to cause the authenticator application to query the blockchain core node for information sufficient to determine the IDs that are associated with a top-level private key associated with the authenticator application.

9. A method of authenticating a user with a client computing device of a decentralized network, the method comprising:
   under the control of a client computing device configured to communicate with a storage server via a network interface and to execute a decentralized application and an authenticator application,
   receiving from an instance of a decentralized application on the client computing device a request to login initiated by a first user selection via a user interface of the decentralized application;
   in response to the received request, invoking an authenticator application for execution on the client computing device;
   with a display, displaying the authenticator application in a second graphical user interface, the second graphical user interface configured to display one or more user IDs associated with the authenticator application;
   with the authenticator application, receiving a second user selection comprising a selected ID of the one or more IDs and identify a pre-defied address on the storage server associated with the selected ID;
   with the authenticator application, generating an application-specific private key that is specific to the decentralized application based on a top-level private key and an identifier associated with the decentralized application;
   with the authenticator application, return the application-specific private key and the pre-defined address to the decentralized application;
   with the decentralized application, access the address on the storage server for read and write access with the decentralized application-specific private key;
   receiving from the decentralized application or from the authenticator application a request to logout; and
   clearing a local state of the decentralized application such that the decentralized application and the authenticator application do not store and have no access to the decentralized application-specific private key.

10. The method of claim 9, wherein the second graphical user interface is a browser comprising navigation icons and a display area configured to display graphics and human-readable content.

11. The method of claim 9, wherein the one or more IDs are stored in a local storage of the client computing device and accessible for reading by the authenticator application.

12. The method of claim 9, wherein invoking the authenticator application comprises opening a session of the authenticator application when no session is currently open.

13. Non-transitory, computer-readable storage media comprising computer-executable instructions for authenticating a user with a client computing device of a decentralized network, wherein the computer-executable instructions, when executed by a computer system, cause the client computer to:
   receive from an instance of a decentralized application executed on the client computing device, a request to login initiated by a first user selection of a graphical button displayed on the display in a first graphical user interface of the decentralized application;
   in response to the received request, invoke an authenticator application;
   display a second graphical user interface of the authenticator application, the second graphical user interface configured to display one or more user IDs associated with the authenticator application;
   receive from the authenticator application a second user selection comprising a selected ID of the one or more IDs;
   in response to the received selected ID, receive from the authenticator application, an application-specific private key that is specific to the decentralized application and an address associated with a storage server;
   with the decentralized application, access the address associated with the storage server for read and write access with the decentralized application-specific private key;
   receive from the decentralized application or from the authenticator application a request to logout; and
   clear a local state of the decentralized application such that the decentralized application and the authenticator application do not store and have no access to the decentralized application-specific private key.

14. The non-transitory, computer-readable storage media of claim 13, wherein the first graphical interface is configured to display data-access permissions requested by the decentralized application.

15. The non-transitory, computer-readable storage media of claim 13, wherein the second graphical user interface is a browser comprising navigation icons and a display area configured to display graphics and human-readable content.

16. The non-transitory, computer-readable storage media of claim 13, wherein the one or more IDs are stored in a local storage of the client computing device and accessible for reading by the authenticator application.

17. The non-transitory, computer-readable storage media of claim 13, wherein invoking the authenticator application comprises opening a session of the authenticator application when no session is currently open.

18. The non-transitory, computer-readable storage media of claim 13, wherein invoking the authenticator application comprises switching to an open session of the authenticator application.

* * * * *